United States Patent
Cho et al.

(10) Patent No.: US 8,510,256 B2
(45) Date of Patent: Aug. 13, 2013

(54) INTER-FACILITY MOVEMENT ESTIMATION APPARATUS, METHOD AND PROGRAM

(75) Inventors: Kenta Cho, Suginami-ku (JP); Naoki Iketani, Kunitachi (JP); Yuzo Okamoto, Yokohama (JP); Hisao Setoguchi, Kawasaki (JP); Masanori Hattori, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 477 days.

(21) Appl. No.: 12/885,736

(22) Filed: Sep. 20, 2010

(65) Prior Publication Data
US 2011/0231357 A1   Sep. 22, 2011

(30) Foreign Application Priority Data
Mar. 19, 2010   (JP) ................................. 2010-065225

(51) Int. Cl.
*G06F 9/44*   (2006.01)
*G06N 7/02*   (2006.01)
*G06N 7/06*   (2006.01)

(52) U.S. Cl.
USPC ......................................................... 706/52

(58) Field of Classification Search
None
See application file for complete search history.

(56) References Cited

U.S. PATENT DOCUMENTS

| | | | |
|---|---|---|---|
| 2010/0070235 A1 | 3/2010 | Cho et al. | |
| 2011/0246054 A1* | 10/2011 | Toma | 701/200 |
| 2012/0209507 A1* | 8/2012 | Serbanescu | 701/410 |

FOREIGN PATENT DOCUMENTS

| | | |
|---|---|---|
| JP | 2009-128343 | 6/2006 |
| JP | 2009-210473 | 9/2009 |
| JP | 2009216500 A * | 9/2009 |

OTHER PUBLICATIONS

Japanese Office Action for Japanese Application No. 2010-065225 mailed on Jan. 6, 2012.

* cited by examiner

*Primary Examiner* — Li-Wu Chang
(74) *Attorney, Agent, or Firm* — Turocy & Watson, LLP

(57) ABSTRACT

In general, embodiments provide an inter-facility movement estimation apparatus including: a movement map which stores location information about facilities and movement times therebetween; a positioning unit which obtains user's location information when starting a movement; a movement candidate list which stores given movement path candidates; a movement situation estimating unit which estimates a user's movement situation; a movement path estimating unit which selects, whenever the movement situation is changed, estimated movement path candidates from the given movement path candidates based on the nearest facility and the user's movement situation; and an adjusting unit which changes the likelihoods of the estimated movement path candidates, wherein one of the estimated movement path candidates having a highest likelihood thereamong is specified as an actual movement path of the user.

5 Claims, 17 Drawing Sheets

GPS POSITIONING: AROUND SHIBUYA STATION
↓
WALKING

——————————→ TIME

FIG. 5

| MOVEMENT CANDIDATES | INTER-STATION MOVEMENT TIME-SERIES DATA | LIKELIHOOD |
|---|---|---|
| 1 | INOKASHIRA-LINE (SHIBUYA → SHINSEN → KOMABA-TODAIMAE) | 3 |
| 2 | GINZA-LINE (SHIBUYA → OMOTE-SANDO → GAIENMAE) | 1 |
| 3 | HANZOMON-LINE (SHIBUYA → OMOTE-SANDO → AOYAMA-ITCHOME) | 1 |
| 4 | DENEN-TOSHI-LINE (SHIBUYA → IKEJIRI-OHASHI → SANGEN-JAYA) | 1 |

FIG. 7

| 12 | SHIBUYA/HANZOMON-LINE/AOYAMA-ITCHOME/FOR OSHIAGE/WEEKDAY |
|---|---|
| | 04 (TO MINAMI-KURIHASHI)   09 (TO OSHIAGE) |

| 12 | OMOTE-SANDO/HANZOMON-LINE/AOYAMA-ITCHOME/FOR OSHIAGE/ WEEKDAY |
|---|---|
| | 07 (MINAMI-KURIHASHI)   12 (OSHIAGE) |

FIG. 8

| MOVEMENT CANDIDATES | INTER-STATION MOVEMENT TIME-SERIES DATA | LIKELIHOOD | LIKELIHOOD CHANGE (TIME TABLE) |
|---|---|---|---|
| 1 | INOKASHIRA-LINE (SHIBUYA → SHINSEN → KOMABA-TODAIMAE) | 1 | ↓2 |
| 2 | GINZA-LINE (SHIBUYA → OMOTE-SANDO → GAIENMAE) | −1 | ↓2 |
| 3 | HANZOMON-LINE (SHIBUYA → OMOTE-SANDO → AOYAMA-ITCHOME) | 3 | ↑2 |
| 4 | DENEN-TOSHI-LINE (SHIBUYA → IKEJIRI-OHASHI → SANGEN-JAYA) | −1 | ↓2 |

FIG. 9

| MOVEMENT CANDIDATES | INTER-STATION MOVEMENT TIME-SERIES DATA | LIKELIHOOD | LIKELIHOOD CHANGE (TIME TABLE) (MOVEMENT SITUATION) | |
|---|---|---|---|---|
| 1 | INOKASHIRA-LINE (SHIBUYA → SHINSEN → KOMABA-TODAIMAE) | 3 | ↓2 | ↑1 |
| 2 | GINZA-LINE (SHIBUYA → OMOTE-SANDO → GAIENMAE) | 1 | ↓2 | ↑1 |
| 3 | HANZOMON-LINE (SHIBUYA → OMOTE-SANDO → AOYAMA-ITCHOME) | 5 | ↑2 | ↑1 |
| 4 | DENEN-TOSHI-LINE (SHIBUYA → IKEJIRI-OHASHI → SANGEN-JAYA) | −3 | ↓2 | ↓1 |

FIG. 11

| MOVEMENT CANDIDATES | INTER-STATION MOVEMENT TIME-SERIES DATA | LIKELIHOOD | LIKELIHOOD CHANGE | | |
|---|---|---|---|---|---|
| | | | (TIME TABLE) | (MOVEMENT SITUATION) | (WiFi POSITIONING) |
| 1 | INOKASHIRA-LINE (SHIBUYA → SHINSEN → KOMABA-TODAIMAE) | 1 | ↓2 | ↑1 | ↓2 |
| 2 | GINZA-LINE (SHIBUYA → OMOTE-SANDO → GAIENMAE) | 3 | ↓2 | ↑1 | ↑2 |
| 3 | HANZOMON-LINE (SHIBUYA → OMOTE-SANDO → AOYAMA-ITCHOME) | 7 | ↑2 | ↑1 | ↑2 |
| 4 | DENEN-TOSHI-LINE (SHIBUYA → IKEJIRI-OHASHI → SANGEN-JAYA) | −5 | ↓2 | ↓1 | ↓2 |

FIG. 13

| MOVEMENT CANDIDATES | INTER-STATION MOVEMENT TIME-SERIES DATA | LIKELIHOOD | LIKELIHOOD CHANGE (MOVEMENT SITUATION) | LIKELIHOOD CHANGE (WiFi POSITIONING) | (TIME TABLE) |
|---|---|---|---|---|---|
| 1 | INOKASHIRA-LINE (SHIBUYA → SHINSEN → KOMABA-TODAIMAE) | 2 | ↑1 | 0 | 0 |
| 2 | GINZA-LINE (SHIBUYA → OMOTE-SANDO → GAIENMAE) | 4 | ↑1 | 0 | 0 |
| 3 | HANZOMON-LINE (SHIBUYA → OMOTE-SANDO → AOYAMA-ITCHOME) | 8 | ↑1 | 0 | 0 |
| 4 | DENEN-TOSHI-LINE (SHIBUYA → IKEJIRI-OHASHI → SANGEN-JAYA) | -6 | ↓1 | 0 | 0 |

FIG. 15

| MOVEMENT CANDIDATES | INTER-STATION MOVEMENT TIME-SERIES DATA | LIKELIHOOD | LIKELIHOOD CHANGE (TIME TABLE) | LIKELIHOOD CHANGE (MOVEMENT SITUATION) |
|---|---|---|---|---|
| 1 | INOKASHIRA-LINE (SHIBUYA → SHINSEN → KOMABA-TODAIMAE) | −2 | ↓2 | ↓1 |
| 2 | GINZA-LINE (SHIBUYA → OMOTE-SANDO → GAIENMAE) | 0 | ↓2 | ↓1 |
| 3 | HANZOMON-LINE (SHIBUYA → OMOTE-SANDO → AOYAMA-ITCHOME) | 10 | ↑2 | ↑1 |
| 4 | DENEN-TOSHI-LINE (SHIBUYA → IKEJIRI-OHASHI → SANGEN-JAYA) | −6 | ↓2 | ↑1 |

INTER-FACILITY MOVEMENT ESTIMATION APPARATUS, METHOD AND PROGRAM

CROSS-REFERENCE TO RELATED APPLICATION(S)

This application claims priority from Japanese Patent Application No. 2010-065225 filed on Mar. 19, 2010, the entire contents of which are incorporated herein by reference.

FIELD

Embodiments described herein relate generally to an apparatus to estimate the user's movement of between facilities.

BACKGROUND

There is proposed a technique to estimate the user's position by sensing the movement of transport means through sensors and comparing the sensed movement and line information. In a system disclosed in JP-2009-128343-A (pages 9 to 14 and FIG. 1), a movement path of transport means is specified by measuring an inter-station movement time through measurement data on air pressure or acceleration and matching the inter-station movement time with line information, when position information is not obtained.

However, in this case, it is difficult to estimate a user's movement path between facilities with high accuracy.

BRIEF DESCRIPTION OF THE DRAWINGS

FIG. 5 illustrates an inter-station movement candidate list.

FIG. 7 illustrates a time table of the Hanzomon-Line.

FIG. 8 illustrates an inter-station movement candidate list after likelihood change due to matching with a time table.

FIG. 9 illustrates an inter-station movement candidate list after likelihood change due to matching with an inter-station movement map.

FIG. 11 illustrates an inter-station movement candidate list after likelihood change due to matching with location positioning.

FIG. 13 illustrates an inter-station movement candidate list after likelihood change due to matching with an inter-station movement map.

FIG. 15 illustrates an inter-station movement candidate list after likelihood change due to matching with an inter-station movement map and matching with a time table.

DETAILED DESCRIPTION

In general, embodiments provide an inter-facility movement estimation apparatus including: a movement map which stores location information about facilities and movement times required to move between the facilities; a positioning unit which obtains location information on a user when the user starts a movement; a movement candidate list which stores given movement path candidates from one of the facilities being nearest to the obtained location information to other facilities and likelihoods of the movement path candidates; a movement situation estimating unit which estimates a movement situation of the user; a movement path estimating unit which selects, whenever the movement situation is changed, estimated movement path candidates from the given movement path candidates based on the nearest facility and the movement situation of the user; and an adjusting unit which changes the likelihoods of the estimated movement path candidates, wherein, among the estimated movement path candidates, one of the estimated movement path candidates having a highest likelihood is specified as an actual movement path of the user.

Hereinafter, embodiments will be described with reference to the accompanying drawings.

Figure 1:
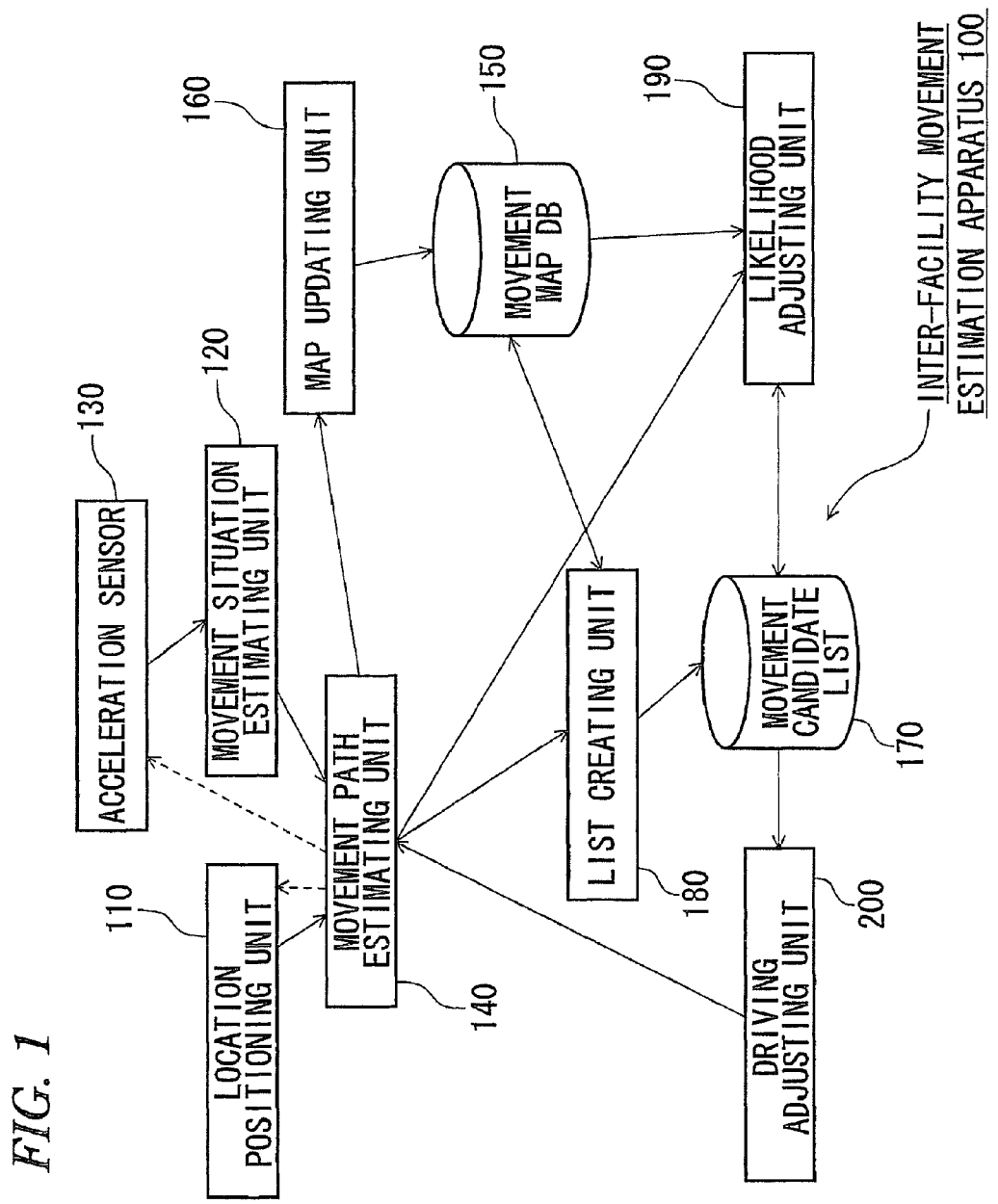
FIG. 1 illustrates an example block configuration of an inter-facility movement estimation apparatus 100 according to an embodiment.

FIG. 1 illustrates an example block configuration of an inter-facility movement estimation apparatus 100 according to the embodiment. Here, a "station" is exemplified as a "facility", and an estimation of a path (inter-station movement path) of the user using a train will be described.

A location positioning unit 110 is a GPS module or a wireless LAN module in a mobile device (mobile phone etc.) held by a user, and obtains information on the location of the user.

A movement situation estimating unit 120 estimates, using information from an acceleration sensor 130, a movement situation of the user, such as, whether the user remains stopped or is walking, or whether a train carrying the user has started or stopped.

Whenever the movement situation is changed, a movement path estimating unit 140 records the location information at the time of change and the movement situation thereafter as movement situation time-series data (indicating, for example, when the transport vehicle (train) carrying the user starts/stops). Further, whenever the movement situation is changed, the movement path estimating unit 140 estimates a facility located along the user's path, to thereby estimate the entire movement path of the user. To estimate the entire movement path, the movement path estimating unit 140 controls time for driving the location positioning unit 110 and the acceleration sensor 130 (as indicated by a dashed line in the figure).

A movement map DB 150 stores location information on the facilities available by the user (in a case where the facilities are stations, the names of the stations, inter-station location information), the time-series data information when the user moves between the facilities (inter-station movement time), and the number of the movements (indicating the number of the inter-station movements conducted by the user so far). The inter-station location information represents an absolute location of each station (GPS information or wireless LAN base station information) or the inter-station relative location (line map indicating the order of stations in each railway/subway line).

A map updating unit 160 updates information in the movement map DB 150 based on the entire movement path estimated by the movement path estimating unit 140. Specifically, the inter-station movement time is updated according to the actual movement time.

A movement candidate list 170 includes a group of movement path (from the facility nearest to the user at the movement start to other available facility) candidates and the likelihood of each candidate. A list creating unit 180 adds the likelihood to each movement path candidate (hereinafter, referred to as "movement candidate") with reference to the movement map DB 150, to create the movement candidate list 170. For example, with reference to the number of the movements stored in the movement map DB 150, a high level of likelihood is allocated to the movement candidate frequently used by the user as the movement path. For simplification, the likelihood indicates how many times the user actually have moved along the path corresponding to the movement candidate.

A likelihood adjusting unit 190 changes the level of the likelihood of each movement candidate of the movement candidate list 170, using the movement situation or the location information including the inter-station movement time or the like of the user by train obtained from the movement path estimating unit 140.

A driving adjusting unit 200 adjusts the movement path estimating unit 140 so that the driving of the location positioning unit 110 or the acceleration sensor 130 is stopped when the movement candidate having a sufficiently high level of likelihood exists in the movement candidate list 170.

Figure 2:
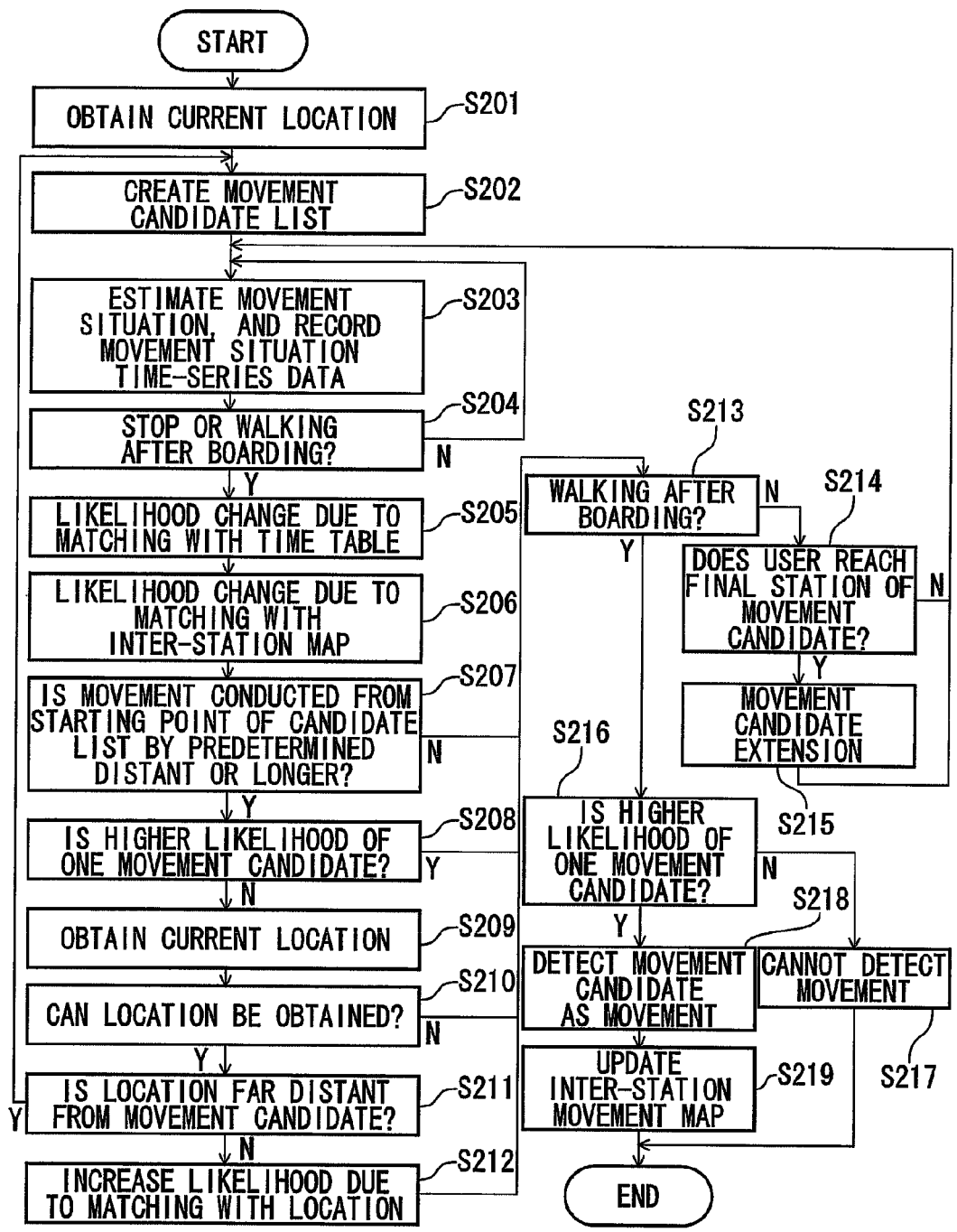
FIG. 2 illustrates an example process flow for estimating the movement of a user between facilities.

FIG. 2 illustrates an example process flow for adjusting likelihood of the movement candidate by the likelihood adjusting unit 190 and for estimating the movement of a user between facilities by the movement path estimating unit 140. Firstly, when the user starts movement, the location positioning unit 110 obtains a current location of the user (S201). Next, the list creating unit 180 set the movement candidate which is available by the user from the station nearest to the current location in the movement candidate list 170, with reference to the movement map DB 150 (S202).

Figure 3:
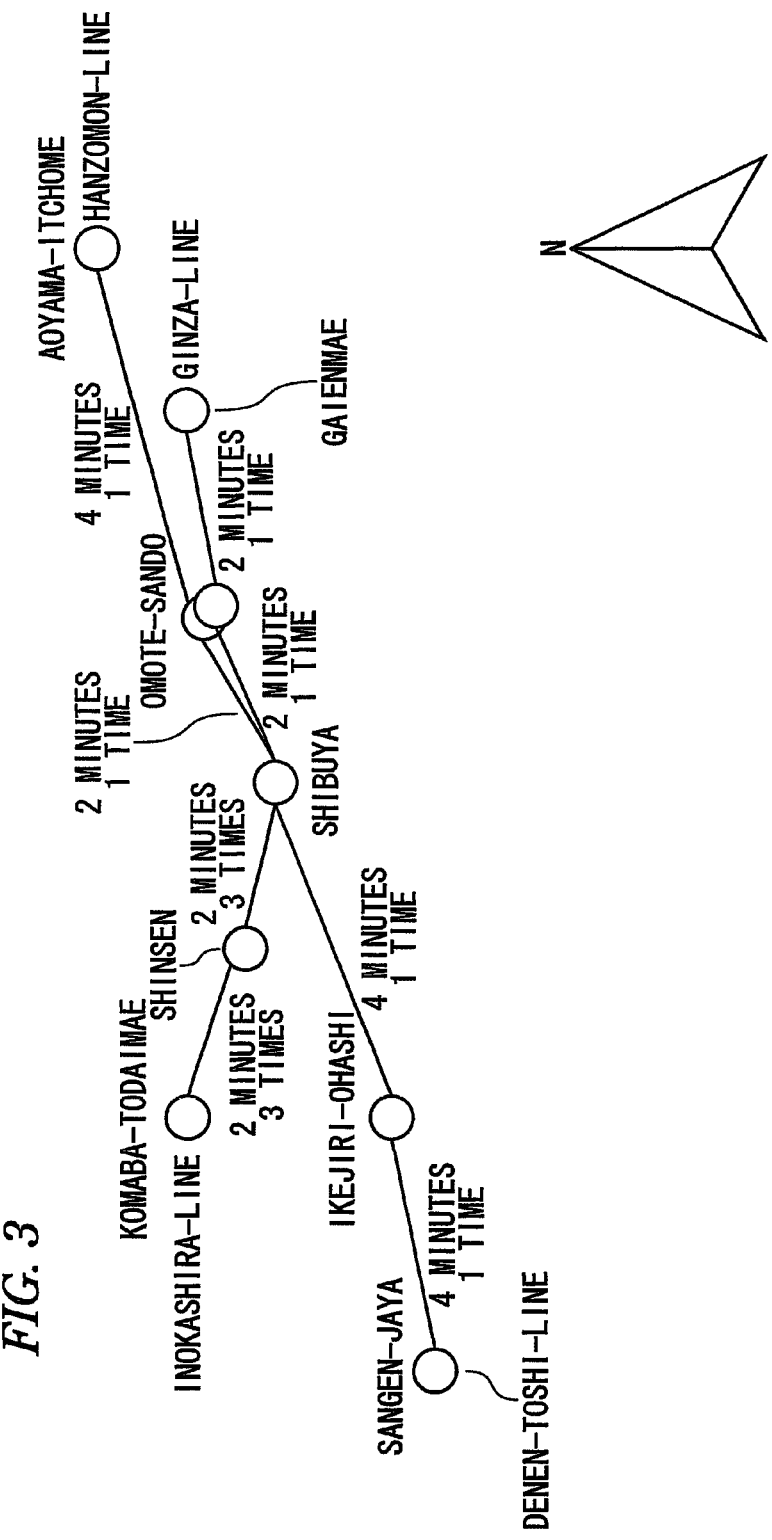
FIG. 3 illustrates an inter-station movement map.

FIG. 3 illustrates an inter-station movement map (an example of a movement map between facilities). In the inter-station movement map, movement paths of the Inokashira-Line, the Ginza-Line, the Hanzomon-Line and the Denen-toshi-Line around the Shibuya station, times taken for the movements and the number of the movements conducted by the user are recorded. The inter-station movement map may be created based on the history of the user's movements in the past from the Shibuya station to the Komaba-todaimae station, the Aoyama-itchome station, the Gaienmae station, and the Sangen-jaya station, or may be created based on the existing line map.

Figure 4:
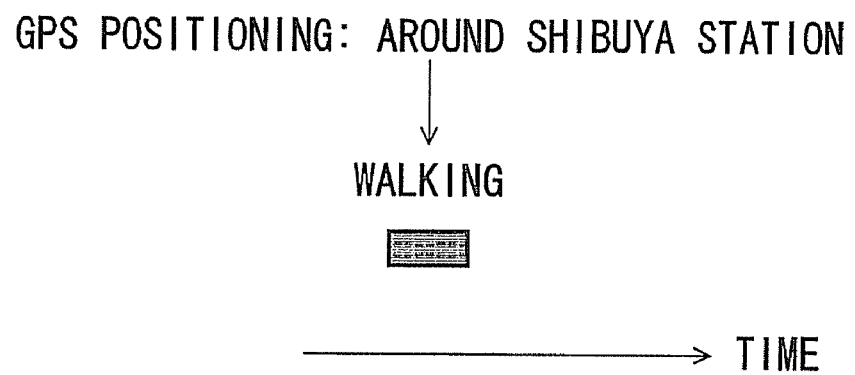
FIG. 4 illustrates movement situation time-series data.

In the present embodiment, a case where the user starts movement from the Shibuya station will be described. If the user starts movement on foot, the location positioning unit 110 measures information on the location of the user. FIG. 4 illustrates movement situation time-series data on the user (it is assumed that the location information on around the Shibuya station can be obtained).

In this step, the list creating unit 180 creates the inter-station movement candidate list in FIG. 5 (an example of the inter-facility movement candidate list 170) (S202). Each movement candidate in the inter-station movement candidate list is provided with inter-station movement order data indicating the order of stations in each line, and the likelihood indicating matching between each movement candidate with the actual movement of the user. When the inter-station movement candidate list is created, the likelihood is set to a higher level as the user conducts the movement between the stations included in each movement candidate more frequently.

In the inter-station movement map illustrated in FIG. 3, the number of the movements through the Inokashira-Line ("Shibuya→Shinsen→Komaba-todaimae") is the largest. Therefore, in the inter-station movement candidate list in FIG. 5, the likelihood of the movement candidate 1 ("Shibuya→Shinsen→Komaba-todaimae") is set to 3, while the likelihoods of the other movement candidates are set to 1.

Next, the movement path estimating unit 140 estimates the movement situation of the user using the movement situation estimating unit 120, and records the movement situation time-series data (S203). In a case where stopping or walking of the user after boarding for a predetermined time is recorded in the movement situation time-series data, it is determined that the train is stopped or the user is transferring to another line after the inter-station movement (S204).

Likelihood Change Step 1: Confirmation of Matching with Time Table

Figure 6:
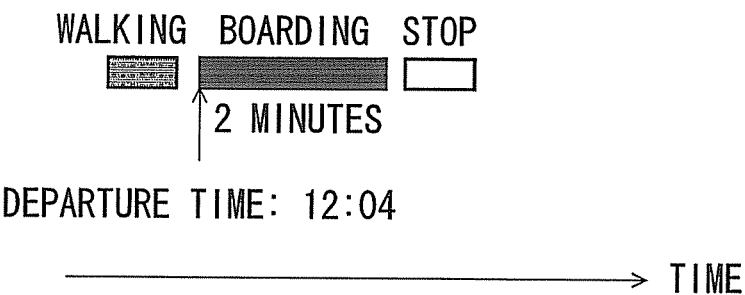
FIG. 6 illustrates movement situation time-series data.

FIG. 6 illustrates movement situation time-series data on the user (in a case where a boarding starting time at the Shibuya station is 12:04). The movement path estimating unit 140 records a two-minute boarding situation and a stop situation thereafter as movement situation time-series data, and in a case where the train stops at a station, referring to the starting time of the boarding situation and a time table of each line of the movement candidate in the inter-station movement candidate list, the likelihood adjusting unit 190 increases the likelihood of the movement candidate in which the boarding starting time matches with a departure time of the time table (S205). The time table data may be downloaded in advance from a server, for example.

FIG. 7 illustrates a time table of the Hanzomon-Line in the movement candidates. In a time table of the Shibuya station in the Hanzomon-Line moving from the Shibuya station to the Omote-sando station and the Aoyama-itchome station, and a time table of the Omote-sando station in the Hanzomon-Line moving from the Omote-sando station to the Aoyama-itchome station, several minutes after 12 o'clock are displayed.

In this case, the likelihood (reliability) of the movement candidate in which the boarding starting time matches with the departure time in the time table is increased with reference to the boarding starting time and the time table of each movement candidate, and the likelihood (reliability) of the movement candidate in which the boarding starting time does not match with the departure time in the time table is decreased.

FIG. 8 illustrates an inter-station movement candidate list after likelihood change due to matching with the time table. Here, the likelihood of a movement candidate 3 (the Hanzomon-Line of "Shibuya→Omote-sando→Aoyama-itchome") is increased by 2, and the other likelihoods are decreased by 2. Alternatively, only the likelihood of the movement candidate 3 may be increased, and the likelihoods of the other movement candidates 1, 2 and 4 may not be changed. On the other hand, only the likelihood of the movement candidate 3 may not changed, the likelihoods of the other movement candidate 1, 2 and 4 may be decreased.

Likelihood Change Step 2: Confirmation of Matching with Inter-Station Movement Map Next, a case where the likelihood is changed by matching the movement situation time-series data (FIG. 6) with the inter-station movement map (FIG. 3) will be described.

A two minute boarding situation from the Shibuya station as a starting point is recorded in the movement situation time-series data in FIG. 6. That is, in a case where the movement situation is changed, if the two minute boarding is performed from the Shibuya station, movement paths which reach the next station are searched from the inter-station map. As a result of the search, since the movements to the Shinsen station and the Omote-sando station are the two minute boarding, the likelihood adjusting unit 190 increases the likelihoods of the movement candidates 1, 2 and 3 moving to the Shinsen station and the Omote-sando station from the Shibuya station by 1, and decrease the likelihood of the other movement candidate 4 by 1. FIG. 9 illustrates an inter-station movement candidate list after likelihood change due to matching with the inter-station movement map.

Here, only the likelihoods of the movement candidates 1, 2 and 3 may be changed (increased), while the likelihood of the other movement candidate 4 may not be changed (decreased). Alternatively, only the likelihoods of the movement candidates 1, 2 and 3 may be not changed (increased), while the other likelihood of the movement candidate 4 may be changed (decreased).

The level of the likelihood may be changed according to a time zone. That is, the likelihood change may be set to be small during the morning and evening rush hours in weekdays where the movement time of the train tends to be incorrect, and may be set to be large during the daytime or holidays where the movement time of the train tends to be stabilized.

Likelihood Change Step 3: Confirmation of Matching with Positioned Location

Next, the movement path estimating unit 140 determines whether the movement is conducted from the starting point of the inter-station movement candidate list by a predetermined distance or longer (S207). The movement distance may be measured by the number of the stations along the movement, or may be measured by the total boarding time. The measurement may be performed in a case where the train stops at the station.

In a case where the movement has been conducted by the predetermined distance or longer, by confirming whether the likelihood of one movement candidate in the inter-station movement candidate list is higher than the other movement candidates, it is determined whether the movement of the user can be specified or not (S208). If the movement of the user can be specified, the driving adjusting unit 200 stops driving the location positioning unit 110 or the acceleration sensor 130, to thereby enable the entire inter-facility movement estimating unit 100 to achieve low power consumption.

In a case where a movement candidate having a high level of likelihood does not exist, the current location is obtained using the location positioning unit 110 (S209). In a case where the current location can be obtained (S210), firstly, it is determined whether the current location is far distant from estimated location of a station (for example, the Shinsen station, the Omote-sando station or the Ikejiri-ohashi station in FIG. 9) estimated as a place where the user exists in the inter-station movement candidate list (S211). If the current location is far distant from the estimated location (Yes in S211), the inter-station movement candidate list is re-created with the nearest station from the current location being a starting point (S202). If not, the likelihood adjusting unit 190 increases the likelihood of the movement candidate in which the current location and the estimated location are close to each other (S212).

Figure 10:
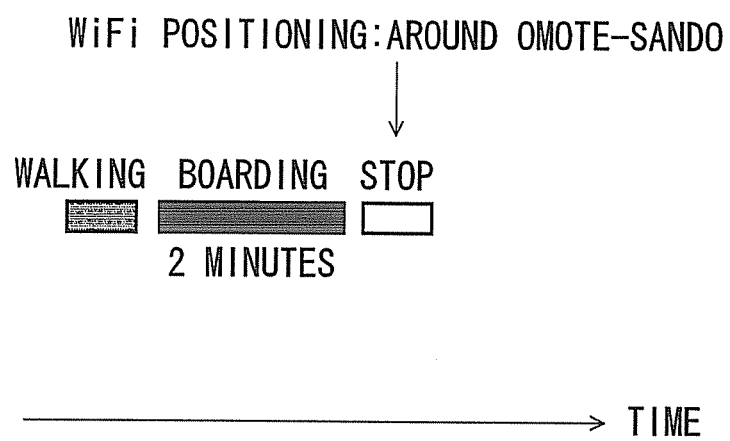
FIG. 10 illustrates movement situation time-series data.

In FIG. 10, in a case where location information on around the Omote-sando station is obtained using WiFi as the location positioning unit 110, the movement path estimating unit 140 confirms matching with the location information of the station in the inter-station movement map, and the likelihood adjusting unit 190 increases the likelihood of the movement candidate in which the first station from the Shibuya station is near the Omote-sando station by 2, and decreases the likelihoods of the movement candidates including the other stations by 2. The inter-station movement candidate list after likelihood change is shown in FIG. 11. According to the location positioning accuracy of the positioning method, the increased or decreased level of the likelihood change may be changed.

Figure 12:
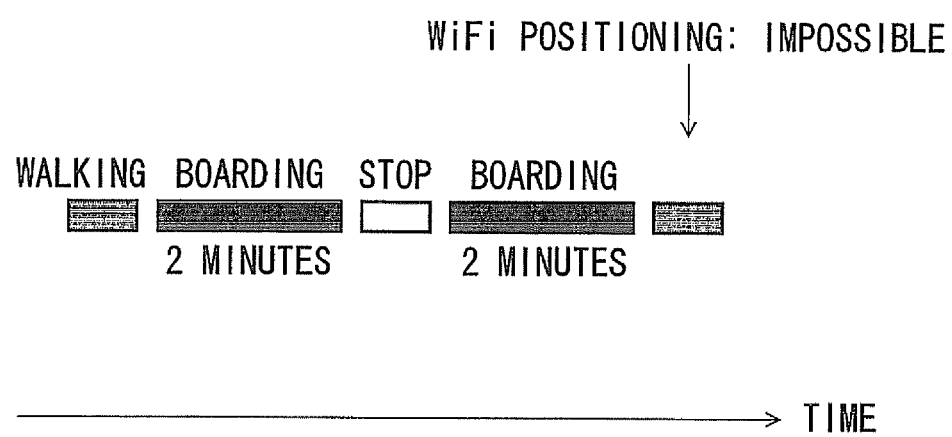
FIG. 12 illustrates movement situation time-series data.

It is assumed that, while the two minute boarding is further recorded, the WiFi positioning nor the matching with the time table can not performed thereafter, as illustrated in FIG. 12. In this case, the likelihood change is performed based on only the movement situation, but is not performed based on the WiFi positioning and the time table. The inter-station movement candidate list after change is shown in FIG. 13. In this case, the movement from the Shibuya station to the Omote-sando station is determined as the movement of the user. Accordingly, the inter-station movement path of the user can be estimated with high accuracy.

Next, it is determined the user is walking after boarding based on the movement speed of the GPS as the location positioning unit 110 (S213). If the user is not walking, firstly, it is determined whether or not the user reaches the final station of each inter-station movement candidate list (S214). If it is determined that the user reaches the final station, an available station therebeyond is searched, to thereby perform extension or addition of the movement candidate (S215).

If the user is walking (Yes in S213), it is determined whether the likelihood of one movement candidate in the inter-station movement candidate list is higher than the other movement candidates (S216). In a case where such a movement candidate does not exist, such an indication that the movement detection cannot be performed is output. (S217).

On the other hand, in a case where such a movement candidate exists, the movement candidate is estimated and output as the movement of the user (S218). Thus, the inter-station movement path of the user can be estimated with high accuracy.

Further, the map updating unit 160 increases the number of the movements in the inter-station movement map corresponding to the movement by 1, and records the movement time actually taken in the inter-station movement map (S219). When calculating the movement time between the stations from the inter-station movement map, an average of the recorded actual movement time may be used.

Modified Example 1

Figure 14:
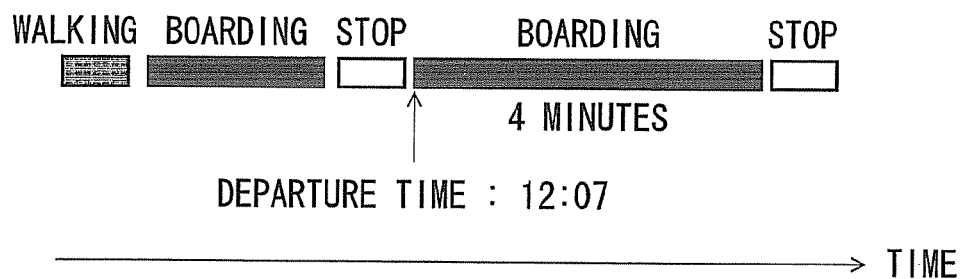
FIG. 14 illustrates movement situation time-series data.

It is assumed that, from the state in FIG. 10, the next boarding situation starts at 12:07, and a four minute boarding situation is detected thereafter, as illustrated in FIG. 14. In this case, the inter-station movement candidate list after likelihood change is shown in FIG. 15. In this case, the movement to the Aoyama-itchome station having a high level of likelihood is determined as the movement of the user. Further, in a case where the likelihood change is performed based on the time table, if any delay is found with reference to information on the corresponding line, the likelihood change may be decreased.

Modified Example 2

The number of the movements stored in the movement map DB 150 is not limited to the number of the actual inter-station movements so far.

For example, the movement time may be estimated from the existing line map to create the movement map. In this case, an initial value of the likelihood in the movement candidate list 170 may be set to zero.

Modified Example 3

Hereinbefore, an estimation of the user's inter-station movement by train is exemplified. However, the inter-facility movement estimation apparatus according to the present embodiment is not limited to the estimation of the movement between the stations, and may be applied to an estimation of the movement between other facilities.

Figure 16:
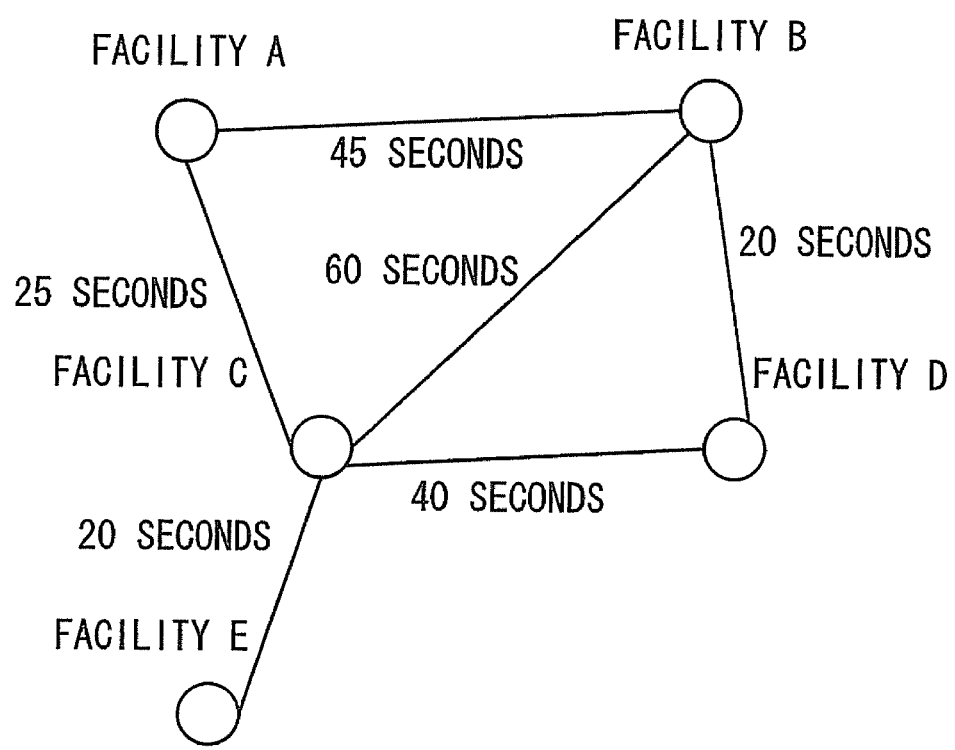
FIG. 16 illustrates an inter-facility movement map in factories.

For example, a movement of a worker who works in facilities in an industrial factory may be estimated. In this case, the movement map DB 150 stores a map including location information (the names of the facilities and a location relation between the facilities) about the facilities in which the worker moves and time taken for movement between the facilities, as shown in FIG. 16, as an inter-facility movement map. Here, as the location relation between the facilities, a relative location between the facilities (indicating each facility and a route group in which the worker moves through each facility) is used.

Figure 17:
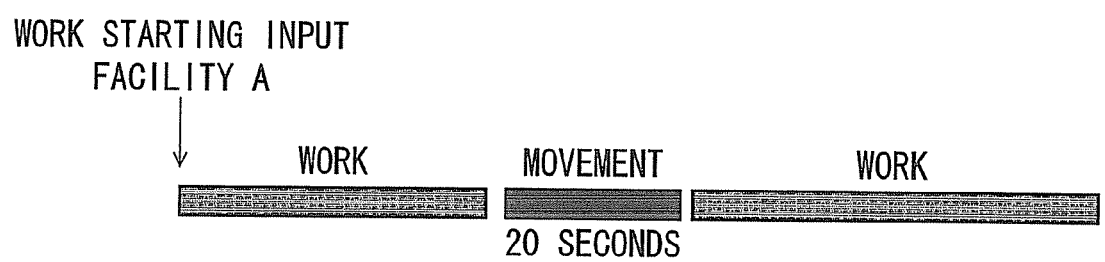
FIG. 17 illustrates movement situation time-series data.

The movement path estimating unit 140 records, as movement situation time-series data on the worker, such data that the worker works in a specified facility shown in FIG. 17, moves to the other facility on foot, and then works in the other facility. By checking the data with the inter-facility movement map, the movement of the worker is estimated, thereby attending an individual difference (walking speed etc.).

For example, to detect the work starting location in the initial facility before movement, location information input by the worker or obtained from an RFID may be used.

While certain embodiments have been described, these embodiments have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and the spirit of the inventions.

What is claimed is:

1. An inter-facility movement estimation apparatus comprising:
   a processor coupled to a memory;
   a movement map which stores
      location information about facilities and
      movement times required to move between the facilities;
   a positioning unit which obtains location information on a user when the user starts a movement;
   a movement candidate list which stores
      given movement path candidates from one of the facilities being nearest to the obtained location information to other facilities and
      likelihoods of the movement path candidates;
   a movement situation estimating unit which estimates a movement situation of the user;
   a movement path estimating unit which selects, whenever the movement situation is changed, estimated movement path candidates from the given movement path candidates based on the nearest facility and the movement situation of the user; and
   an adjusting unit which changes the likelihoods of the estimated movement path candidates when the user moves from a starting point of the movement path list by a predetermined distance or longer and a movement path candidate having a highest likelihood does not exist in the movement candidate list,
   wherein, among the estimated movement path candidates one of the estimated movement path candidates having a highest likelihood of the changed likelihoods is specified as an actual movement path of the user.

2. The apparatus of claim 1,
   wherein the movement path estimating unit refers to a time table, and
   wherein the adjusting unit changes the likelihoods of the estimated movement path candidates in accordance with matching of a movement starting time from a given facility and a departure time on the time table.

3. The apparatus of claim 1,
   wherein the movement path estimating unit respectively records actual movement times of the movements of the user, and
   wherein the adjusting unit changes the likelihoods of the movement path candidates in accordance with matching of the actual movement times and the stored movement times.

4. An inter-facility movement estimation method, the method comprising:
   creating a movement map which stores
      location information about facilities and
      movement times required to move between the facilities;
   obtaining location information on a user when the user starts a movement;
   creating a movement candidate list which stores
      given movement path candidates from one of the facilities being nearest to the obtained location information to other facilities and
      likelihoods of the movement path candidates;
   estimating a movement situation of the user;
   selecting, whenever the movement situation is changed, estimated movement path candidates from the given movement path candidates based on the nearest facility and the movement situation of the user;
   changing the likelihoods of the estimated movement path candidates when the user moves from a starting point of the movement path list by a predetermined distance or longer and a movement path candidate having a highest likelihood does not exist in the movement candidate list; and
   specifying, among the estimated movement path candidates, one of the estimated movement path candidates having a highest likelihood of the changed likelihoods as an actual movement path of the user.

5. A non-transitory computer-readable medium storing an inter-facility movement estimation program form enabling a computer to perform predetermined operations, the operations comprising:
   creating a movement map which stores
      location information about facilities and
      movement times required to move between the facilities;
   obtaining location information on a user when the user starts a movement;
   creating a movement candidate list which stores
      given movement path candidates from one of the facilities being nearest to the obtained location information to other facilities and
      likelihoods of the movement path candidates;
   estimating a movement situation of the user;
   selecting, whenever the movement situation is changed, estimated movement path candidates from the given movement path candidates based on the nearest facility and the movement situation of the user;
   changing the likelihoods of the estimated movement path candidates when the user moves from a starting point of the movement path list by a predetermined distance or longer and a movement path candidate having a highest likelihood does not exist in the movement candidate list; and
   specifying, among the estimated movement path candidates, one of the estimated movement path candidates having a highest likelihood of the changed likelihoods as an actual movement path of the user.

* * * * *